United States Patent [19]
Emery et al.

[11] Patent Number: 5,185,858
[45] Date of Patent: Feb. 9, 1993

[54] IMAGE PRIORITY VIDEO SWITCH

[75] Inventors: Kevin A. Emery; Michael J. Bailey, both of San Diego, Calif.

[73] Assignee: Megatek Corporation, San Diego, Calif.

[21] Appl. No.: 444,767

[22] Filed: Dec. 1, 1989

[51] Int. Cl.[5] .................................... G06F 15/626
[52] U.S. Cl. ................................ 395/158; 395/157; 395/135; 364/747
[58] Field of Search ............... 364/518, 521, 522; 340/747, 750; 395/131, 135, 158, 155, 157

[56] References Cited

U.S. PATENT DOCUMENTS

| | | |
|---|---|---|
| 4,830,012 | 5/1989 | Reiderer .................... 128/653 |
| 4,931,957 | 6/1990 | Takagi et al. ............... 364/521 |
| 4,937,565 | 6/1990 | Suwanukul .................. 340/735 |
| 4,954,818 | 9/1990 | Nakane et al. ............... 340/721 |
| 4,982,345 | 1/1991 | Callahan et al. ............. 364/521 |
| 4,992,782 | 2/1991 | Sakamoto et al. ............ 340/747 |
| 5,001,469 | 3/1991 | Pappas et al. ............... 340/721 |
| 5,005,012 | 11/1991 | Kanda ........................ 340/750 |

*Primary Examiner*—Gary V. Harkcom
*Assistant Examiner*—Phu K. Nguyen
*Attorney, Agent, or Firm*—Baker, Maxham, Jester et al.

[57] ABSTRACT

A video switch having at least two inputs from separate frame buffers and being controlled by a select control signal as to which buffer signal will control the electron guns in the cathode ray tube. The determination of which frame buffer signal is applied on a pixel-by-pixel basis is determined by priority bits from priority buffers. In case of a tie in priority, a tie bit is provided.

11 Claims, 2 Drawing Sheets

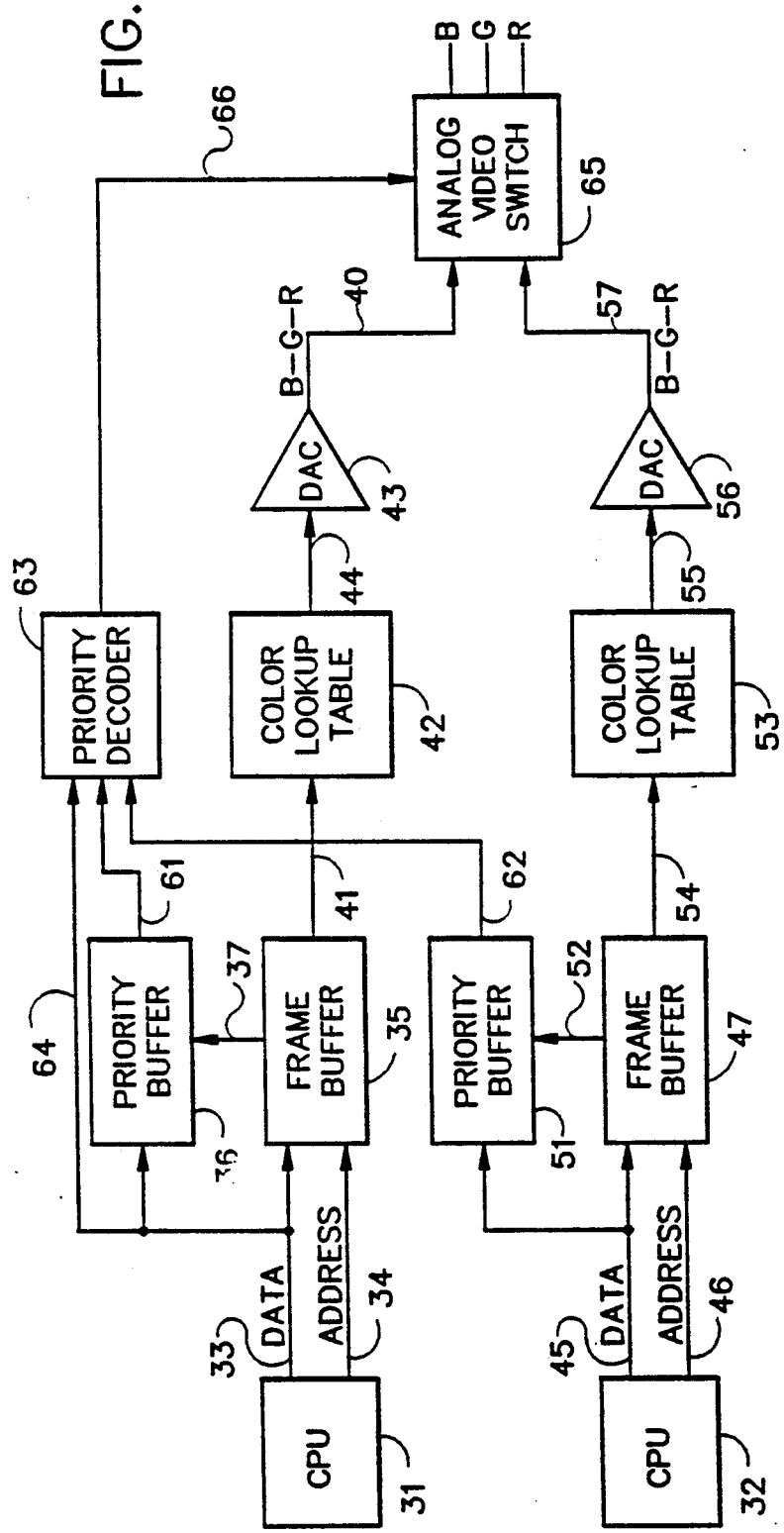

IMAGE PRIORITY VIDEO SWITCH

FIELD OF THE INVENTION

This invention relates generally to computer graphics terminals and displays, and more particularly to circuitry for overlaying and underlaying video images to form a single video graphics display image.

BACKGROUND OF THE INVENTION

It is often necessary to display both graphics and video on a screen such as a cathode ray tube (CRT). This is especially true when the display is employed as part of a graphics workstation.

Prior art devices for displaying multiple graphic processes provided a fixed, that is, not changeable (without redrawing), combinations of text and graphics on a screen. Once the manner of presentation was chosen, it always appeared in that way. For example, if it was determined that text should always overlay the graphics then it would always appear that way. There were no priorities to be determined because the manner of presentation was fixed.

One reason for this manner of presentation is that all of the data, including graphics and text, would pass through a single frame buffer so it would simply provide the information on the screen in accordance with the data inputs. Often in such cases there would be a central processing unit (CPU) for graphics and a separate CPU for text but the outputs of both of these CPU's would be connected to the single frame buffer. In order for this frame buffer to handle the data, the CPU's would have start and stop. The frame buffer would tend to be somewhat overloaded and the speed of operation would be reduced. In some instances where it was determined to have only text where there had been both, the graphics would be deleted but the rest of the screen would be blank rather than have the text fill in the unused space.

SUMMARY OF THE INVENTION

Broadly speaking, this invention is employed as part of the computer graphic display presenting computer graphic multiple video images from different frame buffers, overlaying or underlaying each other on a pixel-by-pixel basis to form a single video graphics display output. These video images are often referred to as windows.

In systems with multiple graphic processes or one processor with multiple needs, for example, graphics and text, each process or need requires full access of a frame buffer and color look-up table to produce the desire images without competing for the frame buffer or destroying any of the contents of the frame buffer. In order to have the desired display, the multiple graphic processes or graphics and text should not both be put through the same frame buffer. To do so decreases the speed of operation of the buffer and provides a less than optimal display on the CRT.

The invention incorporates separate frame buffers for each graphic process or other needs such as text which are addressed by a separate or individual dedicated CPU. In addition, each frame buffer has an associated priority buffer which puts out a priority code bit for each pixel being transmitted through the system. Further, the CPU has a previously determined tie bit for resolving ties of priority from the priority buffers. The outputs of the priority buffers and the tie bits are all addressed to a priority decoder, the output of which is termed a select control signal. This select control signal is addressed to an analog video switch. The other inputs to the analog video switch are the outputs of the frame buffers, as modified by the color look-up table, and having been converted from digital to analog form. This system now controls on a pixel-by-pixel basis the output of the analog video switch as it controls the blue, green, and red video guns of the CRT.

By the means of the system of this invention, the full CRT may have a graphic display with two or more levels of images thereon and it may also have text at predetermined locations on the CRT. Each set of graphics information is operated upon by a dedicated frame buffer which addresses the video screen. If, for example, there is a composite video from the two frame buffers so that certain video graphics overlays or underlays other video graphics, the entire screen may be occupied in proper video presentation, that is, with certain segments in front or behind other segments. If it is determined that text has a higher priority then that text that passes through its frame buffer will be presented as windows where determined on the screen. It will not destroy but merely overlay and supplant the information which is beneath it. If the text input to its frame buffer is turned off, the entire graphics display would then cover the screen just as if the text had never been there. In other words, it would not leave blank spaces where the text was to have been as is the case with some of the prior art.

BRIEF DESCRIPTION OF THE DRAWING

The objects, advantages and features of the invention will be more readily perceived from the following detailed description when read in conjunction with the accompanying drawing, in which:

FIG. 2 is a block diagram of the system of the invention.

DESCRIPTION OF THE PREFERRED EMBODIMENTS

Figure 1:
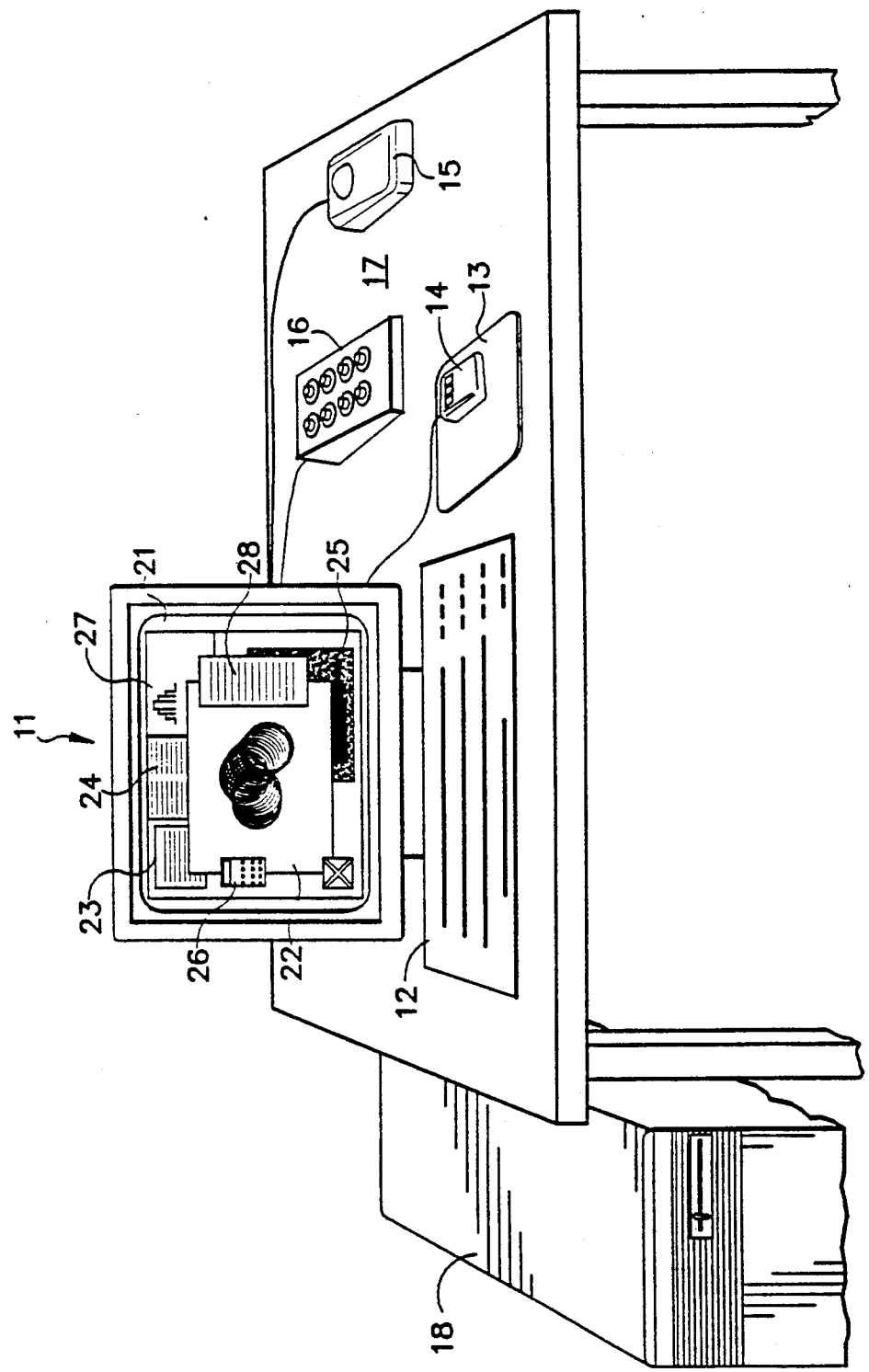
FIG. 1 is an exemplary view of a graphics workstation showing a screen with multiple text data thereon.

With reference now to the drawing and more particularly to FIG. 1 thereof, there is shown a typical workstation having graphics display or CRT 11, keyboard 12, graphics tablet 13, mouse 14, track ball 15, and eight-knob valuator 16, all connected to or on desk top 17. Central processing unit (CPU) 18 is positioned adjacent the desk.

Screen 21 shows graphics in central area 22 and various different elements of text in areas 23, 24, 25, 26 and 28. Note also a graph, which may be considered text or graphics, in area 27. It may be observed that the text elements clearly overlay the graphics portion to the extent that it blanks out a portion of the graphics in certain areas, for example, text areas 26 and 28. The graphics portion overlays text areas 23, 24, 25 and 27.

The screen of FIG. 1 is made possible by the structure of FIG. 2. This figure shows CPU's 31 and 32. For purposes of illustration, it is assumed that CPU 31 processes graphics information and CPU 32 has text information. It could just as easily be that they both have graphics information and there may be more than two CPU's involved. The outputs of CPU 31 are data lines 33 and address lines 34, both sets of lines being inputs to frame buffer 35. Priority buffer 36 receives an input from data lines 33 and from frame buffer 35 over line 37. The output of this frame buffer is provided on line 41 to color lookup table 42, the output of which is provided to digital-to-analog converter (DAC) 43 over line 44. The output of DAC 43 is the blue/green/red control signal on line 40 which is intended to control the color guns of the CRT.

Similarly, CPU 32 has data and address outputs 45 and 46, respectively, as inputs to frame buffer 47. The data line is also connected to priority buffer 51 as is line 52 from frame buffer 47. The output of frame buffer 47 is applied to color lookup table 53 over line 54 and the output of the color lookup table is applied through line 55 to DAC 56 to provide the blue/green/red signal on line 57. Each priority buffer has an output which is applied over respective lines 61 and 62 to priority decoder 63. There is also a tie bit from CPU 31 data line 33 which is connected through line 64 to the priority decoder. The signal from the priority decoder is provided to analog video switch 65 over line 66. This is a select control signal which determines on a pixel-by-pixel basis which signal from the DAC's will energize the blue/green/red guns of the CRT.

The priority buffers determine the output of priority decoder 63 based upon the priority bit assigned to each pixel. In cases of priority ties, the output of CPU 31 over line 64 determines which frame buffer information is displayed on the CRT as that tie bit determines, through the priority decoder, the operation of the analog video switch.

To put it concisely, the purpose of this invention is to allow two or more frame buffers output video displays to be combined, while each maintains its own integrity. This leaves the frame buffer's output control and access separated from each other. This separation of frame buffers is needed to display the desired images and to allow maximum speed of each process to or from the process's frame buffer. This allows multiple overlapping images to be displayed, selectable by the user on a pixel-by-pixel basis.

With two processes and two frame buffers, or one process with multiple needs using two frame buffers, one for text and one for graphics, each process image is drawn into its frame buffer and a plane of importance or priority attribute bit is written with the object. This priority is compared with the priority bit of the other process frame buffer to enable the video switch, under control of signals from the priority decoder, to select the higher priority frame buffer's video to be displayed. In addition to the priority bits being sent to the comparator or priority decoder, a user settable tie bit is also sent and is used to select the outcome when the priority bits from two frame buffer have the same priority. Each process can draw multiple images at different priorities depending on the image's importance within its frame buffers and it will overlay or underlay the other process's images in accordance with the outcome of the priority decoder and tie bit, displaying them as a single image on a CRT screen.

In view of the above description, it is likely that modifications and improvements will occur to those skilled in the art which are within the scope of the appended claims.

What is claimed is:

1. In a graphics display system having a display screen, an image priority video signal determination apparatus for determining the video signal to be applied to the display screen, said apparatus comprising:
   central processing unit means having at least two outputs for data signals and at least two address outputs;
   buffer means coupled to said data outputs and to said address outputs, said buffer means storing the images which are selectively displayed on the screen, each said buffer means having video data outputs and priority outputs coupling a priority level to each data signal;
   priority decoder means connected to said priority outputs, said priority decoder means comparing the relative priority levels of the priority outputs and providing a select control signal output to control output signals on a pixel-by-pixel basis based on the decoded priority levels; and
   analog video switch means connected to the video data outputs and to said select control signal output, said analog video switch means having an output controlling the video signal on the display screen on a pixel-by-pixel basis as controlled by the select control signal.

2. The apparatus recited in claim 1, and further comprising means for resolving priority ties between said priority outputs from said buffer means.

3. The apparatus recited in claim 1, and further comprising:
   color lookup table means coupled at the video data outputs of said buffer means; and
   digital-to-analog converter means coupled between said color lookup table means and said analog video switch.

4. In a graphics display system having a display screen, an image priority video signal determination apparatus for determining the video signal to be applied to the display screen, said apparatus comprising:
   central processing unit means having at least two data signal outputs and at least two address outputs;
   at least two data frame buffers, each connected to one of said data signal outputs and to one of said address outputs, each said data frame buffer independently storing images which are selectively displayed on the screen;
   priority buffer means for each frame buffer, each said priority buffer means having an input from one of said data signal outputs and an input from its associated frame buffer, each said priority buffer means incorporating a preselected level of priority for each data signal;
   priority decoder means receiving a priority input from each said priority buffer means, said priority decoder means comparing the relative priority levels of the priority outputs and having a select control signal output to control output signals on a pixel-by-pixel basis based on the decoded priority levels;
   analog video switch means receiving said select control signal from said priority decoder means; and
   digital-to-analog converter means coupled to the output of each said frame buffer, the output of each said digital-to-analog converter means being coupled to said analog video switch means for pixel-by-pixel control of the video signal to the display screen based on the select control signal.

5. The apparatus recited in claim 4, and further comprising means in said central processing unit means to generate a tie bit to resolve priority ties between said priority outputs from said priority buffer means, said tie bit being coupled to said priority decoder means.

6. The apparatus recited in claim 4, and further comprising a color lookup table coupled between each said frame buffer and its associated digital-to-analog converter means in order to provide the appropriate color and texture information to be presented on the display screen, depending upon the action of the analog video switch.

7. Image priority video determination apparatus for determining the image to be displayed on a display screen, said apparatus comprising:

first central processing unit means having a first data signal output and a first address output;

second central processing unit means having a second data signal output and a second address output;

a first frame buffer connected to said first data signal output and to said first address output, said first frame buffer independently storing images which are to be selectively displayed on the screen;

a second frame buffer connected to said second data signal output and to said second address output, said second frame buffer independently storing images which are to be selectively displayed on the screen;

a first priority buffer having an input from said first data signal output and an input from said first frame buffer and having a first priority output, said first priority buffer having a preselected level of priority for each data signal;

a second priority buffer having an input from said second data signal output and an input from said second frame buffer and having a second priority output, said second priority buffer having a preselected level of priority for each data signal;

priority decoder means connected to said first and second priority outputs and receiving priority bits therefrom, said priority decoder means comparing the relative priority levels of the priority outputs, said priority decoder means having a select control signal output to control output signals on a pixel-by-pixel basis based on the decoded priority levels;

analog video switch means connected to said priority decoder means to receive said select control signal therefrom;

a first digital-to-analog converter coupled between the output of said first frame buffer and the input of said analog video switch means; and a second digital-to-analog converter coupled between the output of said second frame buffer and the input of said analog video switch means;

whereby said image priority video determination apparatus is adapted to control the image on a display screen on a pixel-by-pixel basis as said select control signal determines the signal from said first and second buffers which passes through said analog video switch.

8. The apparatus recited in claim 7, and further comprising means in one of said first and second central processing units to generate a tie bit to resolve priority ties between said priority outputs from said first and second priority buffer means, said tie bit being coupled to said priority decoder means.

9. The apparatus recited in claim 7, and further comprising:

a first color lookup table coupled between said first frame buffer and said first digital-to-analog converter; and a second color lookup table coupled between said second frame buffer and said second digital-to-analog converter;

said first and second color lookup tables providing appropriate color and texture information to be presented on the display screen.

10. A process for controlling the blue, green and red signals to a color display screen on a pixel-by-pixel basis, said process comprising the steps of:

applying different types of data signals and address information to buffer means from a central processing unit;

providing priority signals for the data information in the buffer means, the priority signals having preselected levels of priority for each data signal;

decoding the priority signals by comparing the relative priority levels of the priority signals to provide control signals to a video switch, the control signals result from and relate to the levels of priority as determined in the decoding step on a pixel-by-pixel basis;

applying digital video information from the buffer means to the video switch; and selecting the video information to be displayed on the display screen based on the control signals applied to the video switch on a pixel-by-pixel basis without affecting the content of the buffer means.

11. The process recited in claim 10, and comprising the further step of converting the digital video information from the buffer means to analog information as input to the video switch.

* * * * *